United States Patent
Grigorievich et al.

(10) Patent No.: US 6,751,353 B1
(45) Date of Patent: Jun. 15, 2004

(54) METHOD FOR ADAPTIVE RECOGNITION OF INFORMATION IMAGES AND SYSTEM OF IMPLEMENTATION THEREOF

(76) Inventors: Yakhno Vladimir Grigorievich, 9 Lopatina St., apt. 123, Nizhegorodsry dt., 603163 Nizhny Novgorod (RU); Khil'ko Alexander Ivanovich, 93 Belinskogo St., apt.60, Sovetsky dt., 603024 Nizhny Novgorod (RU); Nuidel Irene Vladimirovna, 3 Shimborskogo St., apt.39, Sormovsry dt., 603037 Nizhny Novgorod (RU); Telnykh Alexander Alexandrovich, 3 Kazanskoe Road, apt.130, Nizhegorosdry dt., 603163 Nizhny Novgorod (RU); Bondarenko Boris Nikolaevich, 5 Kustanaiskaya St., bld.2, apt.130, 115682 Moscow (RU); Sborshikov Vladimir Alexandrovich, 2 Generala Karbysheva Ave., apt.70, 123154 Moscow (RU)

( * ) Notice: Subject to any disclaimer, the term of this patent is extended or adjusted under 35 U.S.C. 154(b) by 548 days.

(21) Appl. No.: 09/786,662
(22) PCT Filed: Jun. 27, 2000
(86) PCT No.: PCT/RU00/00255
  § 371 (c)(1),
  (2), (4) Date: Mar. 7, 2001
(87) PCT Pub. No.: WO01/04829
  PCT Pub. Date: Jan. 18, 2001

(30) Foreign Application Priority Data
  Jul. 8, 1999 (RU) .......................................... 99115239

(51) Int. Cl.[7] ................................................. G06K 9/00
(52) U.S. Cl. ....................... 382/218; 382/181; 382/309; 348/254
(58) Field of Search ................................. 382/218, 217, 382/181, 167, 149, 260, 209, 210, 236, 238, 239, 309, 318; 345/596; 714/714, 735, 819, 824; 700/30; 348/254

(56) References Cited

U.S. PATENT DOCUMENTS

| 5,465,308 | A | * | 11/1995 | Hutcheson et al. | 382/159 |
| 5,748,780 | A | * | 5/1998 | Stolfo | 382/232 |
| 6,418,424 | B1 | * | 7/2002 | Hoffberg et al. | 706/21 |

(List continued on next page.)

Primary Examiner—Timothy M. Johnson
Assistant Examiner—Barry Choobin
(74) Attorney, Agent, or Firm—Notaro & Michalos P.C.

(57) ABSTRACT

The invention relates to the information image recognition. Its usage for the adaptive processing and classification of an information stream allows to increase the recognition accuracy for a wide class of objects. The method for adaptive recognition of information images is implemented in the corresponding system including an adaptive information image processing unit, a model image comparison unit and a model image correcting unit. The technical result is achieved by virtue of introducing the following units into the system: a memory unit, a processed information image recovering unit and a decision unit, the adaptive information image processing unit being intended for processing an input information image in accordance with any one from patterned algorithms for recognizing the probable information images, the comparison unit being intended for comparing the input information image with the model image, and the model image correcting unit being implemented in the form of a recognition algorithm correcting unit and intended for correcting the next recognition algorithm by the signal from the decision unit in the case when discrepancy estimates from the comparison unit exceed corresponding thresholds, and for realigning the adaptive information image processing unit and processed information image recovering unit in accordance with the corrected algorithms.

20 Claims, 4 Drawing Sheets

U.S. PATENT DOCUMENTS

| | | | | |
|---|---|---|---|---|
| 6,504,944 | B2 * | 1/2003 | Mihara et al. | 382/118 |
| 6,650,777 | B1 * | 11/2003 | Jensen et al. | 382/203 |
| 6,665,439 | B1 * | 12/2003 | Takahashi | 382/199 |
| 2001/0038712 | A1 * | 11/2001 | Loce et al. | 382/190 |
| 2002/0057838 | A1 * | 5/2002 | Steger | 382/197 |
| 2002/0126879 | A1 * | 9/2002 | Mihara et al. | 382/118 |
| 2003/0012442 | A1 * | 1/2003 | Hashimoto et al. | 382/218 |
| 2003/0123734 | A1 * | 7/2003 | Li et al. | 382/190 |
| 2003/0133613 | A1 * | 7/2003 | Ono | 382/209 |

* cited by examiner

METHOD FOR ADAPTIVE RECOGNITION OF INFORMATION IMAGES AND SYSTEM OF IMPLEMENTATION THEREOF

FIELD AND BACKGROUND OF THE INVENTION

The invention relates to the information image recognition and can be used for adaptive processing and classification of information flow.

At present, a variety of adaptive image recognition techniques are known for both pictures and other forms of images such as sound or tactile ones.

In the paper "Research decision-making system by complex-image fragments using neuron-like algorithms" (Izv. Vyssh. Uchebn. Zaved., Radiofiz., vol. 37, 1994, No. 8, pp. 961–986 (in Russian)) by V. G. Yakhno et al. is described an approach which outlines the following ways for solving the problem of information image adaptive recognition: signal encoding; back recovering of signals from their code descriptions; forming a set of estimates for code descriptions and recovered signals; forming a tree of possible solutions; determining the efficiency or correctness of encoding; recovering and estimating; and realigning operating algorithms in the case of their inefficiency.

In this approach, as mentioned above, only general ways are outlined, but there are no particular operation sequence for adaptive image recognition and no devices for implementing that approach. The recognition algorithms were assumed to be predetermined in that paper.

In the RF Patent No. 2090928 (Int. Cl. G 06 K 9/00, Sep. 20, 1997), is described a method for adaptive signal recognition on the state of object, which method includes steps of creating recognition standards and correcting them during a training, comparing these standards with a signal being analyzing, forming estimates of object states, and comparing these estimates with the predetermined recognition threshold, the step of correcting the formed standards being iterative. A drawback of this method is that the recognition is performed by comparing the signal being recognized with the standards obtained at the training stage and not liable to correction during recognition, i.e., obtained without checking the degree of actual correspondence between these standards and the signal being recognized. Thus, a situation can arise in which the signal being recognized is different from the signals by which the standards were formed and corrected at the training stage, which results in recognition errors.

The U.S. Pat. No. 4,491,962 (Int. Cl. G 06 K 9/00, Jan. 1, 1985) describes a recognition method which determines the optimal threshold for obtaining a binary image signal. In this method, the video signal of an object is converted to a binary image signal on the basis of each of various values of the threshold level, in which determining a template expected to lie somewhere on the object surface is chosen as a standard one. Then a set of partial templates is cut out of the given region of a binary image signal corresponding to each value of the threshold level, and the degree of coincidence between each partial template and the indicated standard template is determined. The value of the threshold level is chosen which corresponds, as a whole, to the maximum degree of coincidence between this set of partial templates and the standard template taking into account the coincidence degrees for each value of the threshold levels. The object image is divided into parts, and the maximum degree of coincidence between the set of partial templates and the standard template is chosen. This process is performed for all parts of the image, and the final sum of maximum values of all surface parts is used as the coincidence degree in whole. A drawback of this method is that the image which can be absent in the picture being recognized and is not liable to correction can be used as the standard template. This can lead to incorrect recognition.

This method is implemented in a system for adaptive recognition of information images described in the same U.S. Pat. No. 4,491,962 and comprising an information image adaptive processing unit intended for processing an, input information image in accordance with the algorithm developed beforehand for recognizing information images; a memory unit intended for storing the information image processed by the information image adaptive processing unit at least until finishing the image recognition procedure; a comparison unit intended for comparing the input information image being processed in the information image adaptive processing unit with the model image and for estimating discrepancies between the compared images; and a decision unit intended for deciding on the recognition of the information image. The drawbacks of this system are the same as those of the method being implemented by this system.

The U.S. Pat. No. 5,054,093 (Int. Cl. G 06 K 9/00, Oct. 1, 1991) describes a parallel multiunit adaptive nonlinear coupler and classifier for implementing another method for an adaptive recognition which is closest to the claimed method. This known method comprises steps of: forming in advance models of probable information images (pattern prototypes related to different classes of patterns); processing each input information image in accordance with the algorithm developed in advance for recognizing information images; comparing the input information image being processed (input pattern) with the prototype; and correcting the recognition algorithm by storing a new prototype if the input pattern does not coincide with a region of the initial prototype; and, in the case of coincidence, modifying the prototype in the memory for matching it with the input pattern. A drawback of this method is that only one recognition algorithm with replaceable prototypes is used, which narrows the applicability of this method. Moreover, in this method, a coincidence is estimated with the prototypes of the information images already processed, which precludes to check the correctness of the processing procedure itself and its effect in the result being obtained.

As was mentioned above, this method is implemented in an apparatus which is chosen as the nearest analogue of the claimed one and comprises: an information image adaptive processing unit intended for processing the input information image in accordance with the algorithm developed in advance for recognizing information images; a comparison unit intended for comparing the input information image being processed in the information image adaptive processing unit with the model image, and for estimating discrepancies between the compared images; a model pattern correcting unit intended for correcting the pattern image by signals from the comparison unit. The drawbacks of this system are the same as those of the method being implemented by this system.

SUMMARY OF THE INVENTION

The task of this invention is to develop a method and a system for adaptive recognition of information images which could optimize the procedure for choosing the most exact and fast algorithms for processing a large flow of information in accordance with the type of the problem to be solved and the nature of the data being processed. In other words, this invention is aimed at solving the problem of accelerating a search for adequate processing and decision algorithms to make such work automatic. At the first stage, the system in which this invention has been implemented is necessary to develop and create automatic recognizing devices, and then can itself be included as a component part into an adaptive self-tuned recognizing system which is automatically aligned to changed operating conditions.

Thus, the technical result being reached is in increasing a recognition accuracy for the wider class of objects.

To solve this problem and reach the required technical result, a method is claimed for adaptive recognition of information images, comprising steps of: processing each input information image in accordance with a recognition algorithm; comparing the input information image being processed with a model image in order to estimate discrepancies between the compared images; comparing at least one estimate of the obtained discrepancies with at least one predetermined threshold; when said estimates exceed the predetermined thresholds, correcting the recognition algorithm, and repeating the previous operations using said recognition algorithm for the same input information image, wherein, in accordance with the present invention, said method further comprises steps of: forming models of probable information images; for the probable information images, creating the recognition algorithms based on the formed models; processing the information image in accordance with one of the created recognition algorithms; performing, after said processing step, a model recovering of the processed information image in accordance with the recovery algorithm which is inverse of the utilized recognition algorithm; the step of comparing the input information image being processed is performed with the recovered model image, calculating coincidence estimates, and then performing said step of comparing the estimates with the predetermined thresholds; when the predetermined number of estimates do not exceed the predetermined thresholds, deciding on the recognition of the input information image; correcting the recognition algorithm when the predetermined number of estimates exceed the predetermined thresholds, and then repeating, using the corrected algorithm for the same input information image, the steps of processing the information image, recovering the model image, comparing those images, and comparing the obtained estimates; repeating the previous step until deciding on the recognition of the input information image, or deciding on the absence of possibility for recognizing this image on the basis of an available set of algorithms.

In so doing, the step of processing each input information image includes at least steps of encoding and normalizing said input information image, and in the step of encoding, a step of at least rough encoding and exact encoding for the input information image can be performed.

It is distinctive that the step of model recovering is performed in the same stages as the step of processing the input information image but in inverse order with respect to the order in said step of processing the input information image.

In this case, the step of comparing the input information image being processed with the recovered model image is performed for all processing stages and corresponding recovery stages.

Another distinction is that the recovered model image is displayed for visual perception by an operator.

The step of forming models of probable information images is performed either in advance or during the mentioned comparisons, and the step of creating the algorithms for recognizing the probable information images is performed either in advance or during the mentioned comparisons.

Finally, the step of correcting the recognition algorithm is performed either by defining more precisely its parameters or its operation sequence, or by replacing this algorithm.

To solve the same problem and reach the same technical result, a system is claimed for adaptive recognition of information images, comprising: an adaptive information image processing unit intended for processing an input information image in accordance with a recognition algorithm; a comparison unit intended for comparing the input information image being processed in the adaptive information image processing unit with a model image, and for estimating discrepancies between the compared images; a model image correction unit intended for correcting the model image by signals from the comparison unit, wherein, in accordance with the present invention, said system further comprising: a memory unit intended for storing the information image processed by the information image adaptive processing unit at least until finishing the image recognition procedure; a processed information image model recovering unit intended for recovering the processed information image in accordance with a recovery algorithm which is inverse of the recognition algorithm utilized in the information image adaptive processing unit; and a decision unit intended for comparing at least one of the discrepancy estimates obtained in the comparison unit with at least one predetermined threshold, and for deciding in dependence on a result of that comparison; the information image adaptive processing unit being intended for processing the input information image in accordance with any of the created algorithms for recognizing the probable information images; the comparison unit being intended for comparing the input information image with the model image recovered by the processed information image model recovering unit, and for estimating discrepancies between the compared images; and the model image correction unit being made in the form of a recognition algorithm correction unit and intended for correcting the next recognition algorithm by a signal from the decision unit in the case when the discrepancy estimates from the comparison unit exceed corresponding thresholds and for realigning the information image adaptive processing unit and the information image model recovering unit in accordance with the corrected algorithms.

In so doing, the information image adaptive processing unit can comprise at least an encoding subunit and a feature normalizing subunit, the encoding subunit can consist of a rough encoding subblock and an exact encoding subblock.

The system can be equipped with a first and second demonstration displays for displaying the input information image and the recovered model image, respectively.

A specific feature of the system is in that it can further comprise: an additional information image adaptive processing unit intended for processing the input information image in accordance with any of the created algorithms for recognizing a probable noise and interference; an additional processed information image model recovering unit intended for recovering the processed information image in accordance with a recovering algorithm that is inverse of the recognition algorithm utilized in the additional information image adaptive processing unit; an additional comparison unit intended for comparing the input information image being processed in the additional information image adaptive processing unit with the model image recovered by the additional processed information image model recovering unit, and for estimating discrepancies between the compared images; an additional decision unit intended for comparing at least one of the discrepancy estimates obtained in the additional comparison unit with at least one additional predetermined threshold, and for deciding in dependence on a result of that comparison; the memory unit is also intended for storing the information image processed by the additional information image adaptive processing unit at least until finishing the image recognition procedure; the recognition algorithm correcting unit is also intended for correcting the next algorithm for recognizing a probable noise and interference by a signal from the additional decision unit in the case when the discrepancy estimates from the additional comparison unit exceed corresponding thresholds, and for realigning the additional information image adaptive processing unit and the additional information image model recovering unit in accordance with the corrected algorithms.

In this case, each pair of main and additional units having the same name can be made in the form of one common unit having the same name, and the recognition algorithm correcting unit can be also intended for alternating the probable information image and probable noise and interference recognition processes in each common unit.

No objects of the same purpose, containing the corresponding features of the objects described above, have been revealed in the existing engineering level. This makes it possible to consider the claimed method and system new.

From the background of the invention no sources of information are known comprising the whole set of the essential features of the described objects. This allows to consider the claimed method and system novel.

From the background of the invention no sources of information are also known where the set of the features have been described which could distinguish the claimed objects from their nearest analogues. This allows to consider the claimed method and system having the inventive step.

BRIEF DESCRIPTION OF THE DRAWINGS

This invention is illustrated by drawings where identical reference positions in different drawings relate to identical elements.

BRIEF DESCRIPTION OF THE PREFERRED EMBODIMENT

Figure 1:
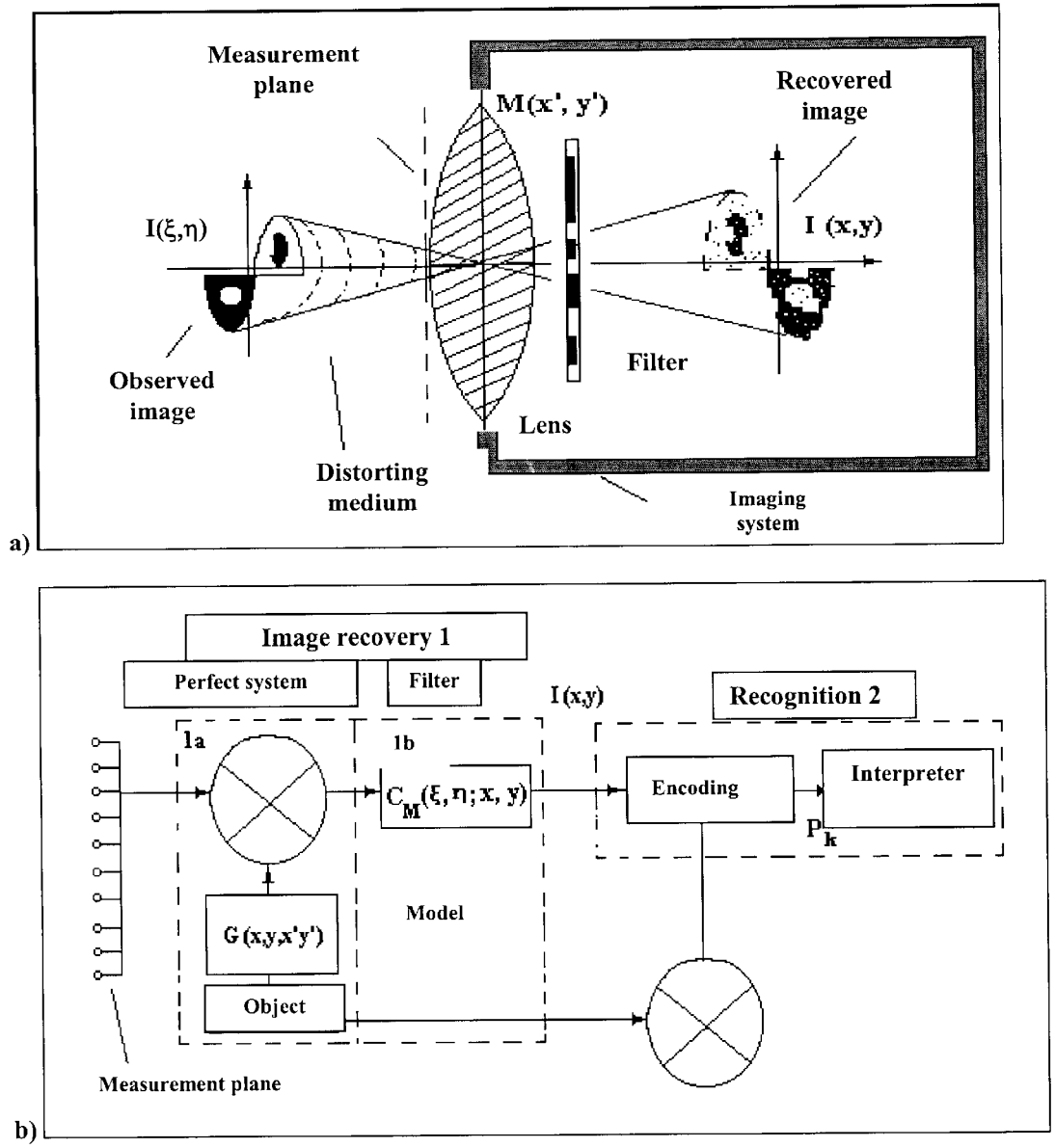
FIG. 1 illustrates an image creation using a conventional lens.

Before describing in detail the present invention, let us consider image construction using a conventional lens (V. A. Zverev, Radiooptika, Sovetskoe Radio, Moscow, 1975; V. A. Zverev, Physical Principles of Image Formation by Wave Fields, IAP RAS Press, Nizhny Novgorod, 1998 (both in Russian)). The image created using a conventional lens is illustrated in FIG. 1a and is determined by the expression $$I_{Creat}(x, y) = \int I_{Bx}(\xi, \eta) \cdot G_{Mdl}(\xi, x, \eta, y) \cdot d\xi \cdot d\eta \qquad (1)$$

where $G_{Mdl}(\xi, x, \eta, y)$ is a given Green's function. A computer counterpart for processing and deciding, which follows the operating algorithm of a conventional lens, is given in FIG. 1b.

The expression $G_{Mdl}(\xi, x, \eta, y)$ contains a priori information on the state of the observation medium before the lens, lens aperture and other characteristics. Thus, construction of an image $I_{creat}(x,y)$ in accordance with expression (1) by an actual flow $I_{in}(x,y)$ of data from the medium before the lens requires the use of a model of a chosen or predetermined observation situation. On the basis of such a model, one can construct in each case algorithms for filtering noise, interference, and the effect of irregularities of the medium before the lens as well as obtain a priori concepts of motions in the medium or motions of the object itself. The model description, given by the form of the function $G_{Mdl}(\xi, x, \eta, y)$, also makes it possible to represent the constructed image $I_{creat}(x,y)$ in a compressed, i.e., coded form through a set of necessary features $P_k$.

However, an absence of full knowledge of the medium before the lens and of the objects observed makes it necessary to put forward hypotheses on observed images $I_{creat}(x,y)$ of objects and then check these hypotheses, i.e., adapt the image processing algorithms. Using the code description $P_k$, obtained after the processing, one needs to recover the model representation $I_{mdl}(x,y)$ of the input image and calculate the set of estimates $\Delta_{\Sigma inf}$ comparing the results of different stages in the encoding (processing) and recovering procedures. The processing algorithms, to which the best estimates corresponds in comparing with the recovered model representations, i.e., the most "correct" processing algorithms, are selected for the subsequent recognition. "Incorrect" algorithms are either corrected or replaced by new ones on the basis of comparison results.

Figure 2:
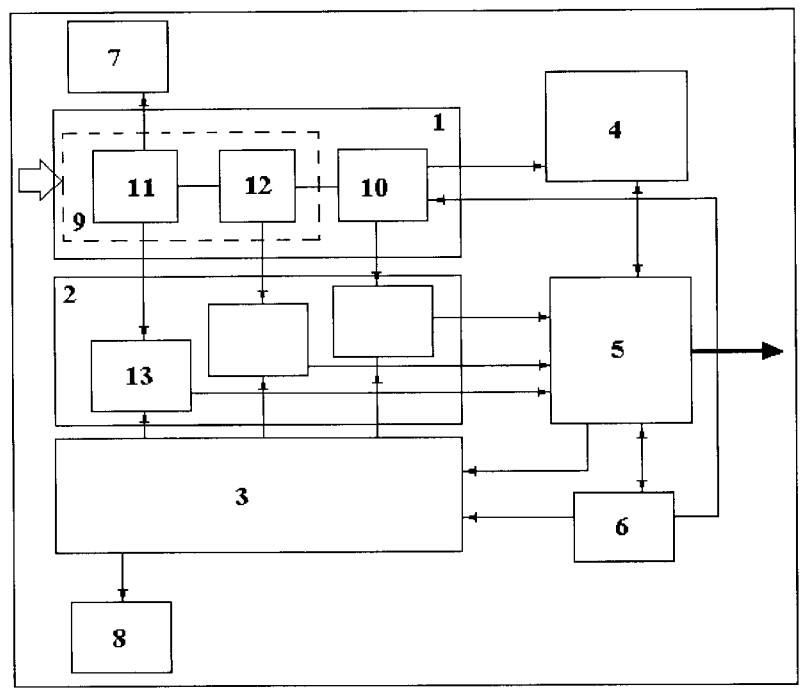
FIG. 2 represents a block diagram of the system for adaptive recognition of information images in accordance with the present invention.

FIG. 2 presents the block diagram of the system for adaptive recognition of information images in accordance with the present invention. This system comprises an adaptive information image processing unit 1, a comparison unit 2, a processed information image model recovering unit 3, a memory unit 4, a decision unit 5, and a recognition algorithm correction unit 6. The system can also include the first and second demonstration screens 7 and 8, respectively. The adaptive information image processing unit 1 can also consist of an encoding subunit 9 and a normalizing subunit 10. The encoding subunit 9, in turn, can consist of a rough encoding subblock 11 and an exact encoding subblock 12. The comparison unit 2 consists of comparing units 13 according to the number of subunits and subblocks in the adaptive information image processing unit 1. The processed information image model recovering unit 3 comprises the same number of subunits and subblocks as that comprised in the adaptive information image processing unit 1.

The method for adaptive recognition of information images in accordance with the present invention is implemented in the system for adaptive recognition of information images presented in FIG. 2 in the following manner.

The first of the above steps in this method is indicated a step of forming models of probable information images. This step of forming models can be performed in advance based on model concepts of the recognized object structure. However, new models can also be formed by comparing the processed and recovered images if the estimates of these comparisons do not satisfy the recognition condition of the image being processed. As a rule, the models of probable information images are formed outside the system shown in FIG. 2, although this can be done, for example, in the recognition algorithm correction unit 6. For this purpose, in the unit 6 can be provided an appropriate processor with an appropriate program loaded into it. Such a program must take into account all relationships and the possible changes between the structural elements of the recognized object model description, and thus, the program will permit to take into account the greater variety of recognized image versions by changing special parameters.

Using the formed models of probable information images, probable information image recognition algorithms are created. This operation, like the previous one, can be performed in the model image correction unit 6 by the same methods and means as the previous model forming operation. Two of possible mechanisms for creating probable information image recognition algorithms are described in the above mentioned analogues RU 2090928 C1 and U.S. Pat. No. 4,491,962 A. The particular form of the created algorithms is determined by chosen models of probable information images. The created algorithms can be stored in the corresponding region of own memory of the model image correction unit 6.

A data flow $I_{in}(x,y)$ comes from the external medium to the inputs of the adaptive information image processing unit 1. Processing in the unit 1 can consist, for example, of encoding and normalizing (code features are converted into a system of orthogonal features), and the encoding itself can be performed in two stages: rough and exact. These operations are accomplished in the corresponding subunits and subblocks of the adaptive information image processing unit 1: the encoding is performed in the subunit 9, rough and exact encoding being performed in subblocks 11 and 12, respectively, and the normalizing is accomplished in the subunit 10.

The operations being performed in the adaptive information image processing unit 1 are chosen so as to encode all a priori known important details of the information image being recognized.

Code description of the information image processed in the unit 1 is stored in the memory unit 4 at least until finishing the recognition procedure.

This set of information image features stored in the unit 4 is directed by the decision unit 5 to the processed information image model recovering unit 3. In the unit 3, the model image is recovered as a result of a process that is inverse of that in the adaptive information image processing unit 1. The resulting recovered model image is displayed on the second demonstration screen 8, while the first demonstration screen 7 maps the information image obtained from the input data flow $I_{in}(x,y)$. This information image can be displayed on the screen 7, for example, from the rough encoding subblock 11 in the encoding subunit 9. In a similar fashion, the recovered model image is displayed on the screen 8 from the corresponding subunit or subblock in the processed information image model recovering unit 3.

All signals obtained in the processed information image model recovering unit 3 are compared in the comparison unit 2 with the corresponding signals obtained during processing in the unit 1. The discrepancy estimates obtained in the units 13 are compared with the corresponding threshold values in the decision unit 5. If the predetermined number of these estimates (for example, any two of three estimates, or the second and third in particular) are below the corresponding thresholds chosen beforehand, then the unit 5 decides on recognizing the input information image. As a result, the unit 5 can produce a signal on the output (for example, to the executing mechanisms in the object access system) or transmits to its output the processed information image stored in the memory unit 4. Thresholds in the decision unit 5 can be chosen at the step of forming the models of probable information images or at the step of creating the corresponding processing algorithms.

If the steps of comparing in the unit 2 and comparing the obtained estimates with the thresholds in the unit 5 shows that the estimates exceed the greater number of thresholds than the predetermined number, then the decision unit 5 addresses the recognition algorithm correcting unit 6. Accordingly, the unit 6 corrects the recognition algorithm either by specifying its parameters or operation sequence or by replacing the algorithm. In order to do this, the recognition algorithm correcting unit 6 produces corresponding control signals to the unit 1 and 3 (corresponding subunits and subblocks of these units). According to these control signals in the memory buffers of those units, subunits, and subblocks, the sets of programs responsible for the operation of those blocks are changed.

Figure 3:
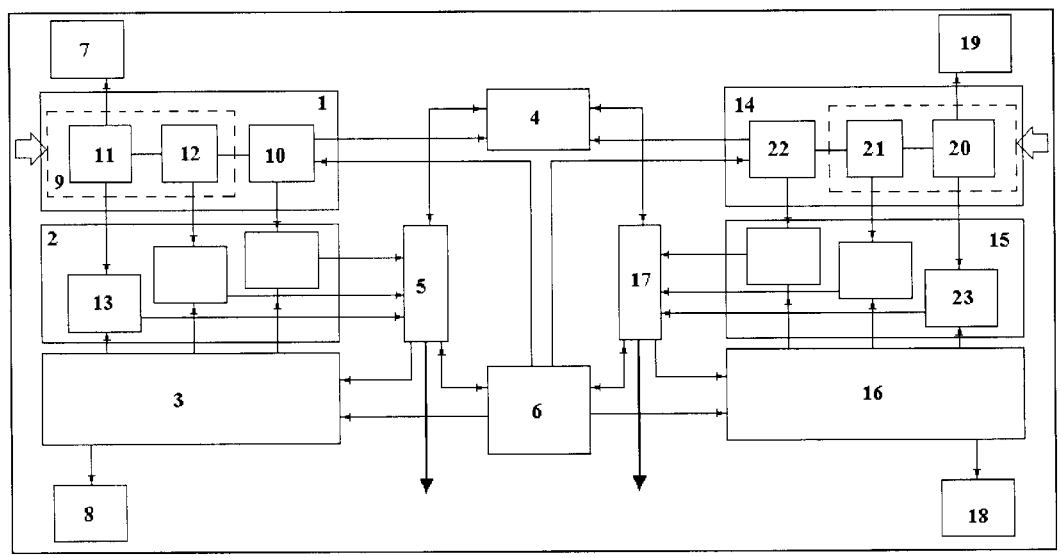
FIG. 3 represents the block diagram of the complicated system for adaptive recognition of information images in accordance with the present invention.

FIG. 3 shows the block diagram of a more complex system for adaptive recognition of information images which is nevertheless falls into the scope of the present invention. Besides the units shown in FIG. 2 and designated by the same references, this system also includes an additional adaptive information image processing unit 14, an additional comparison unit 15, an additional processed information image model recovering unit 16, and an additional decision unit 17. These units can have the same structure as the corresponding units 1 to 3 and 5 in FIG. 2, but their name reflects the processing noise and interference images rather than information images. In so doing, the memory unit 4 is intended for storing also the noise and interference information image, and the recognition algorithm correcting unit is also intended for correcting the next recognition algorithm of the probable noise and interference by a signal from the additional decision unit 17 in the case when discrepancy estimates from the additional comparison unit 15 exceed corresponding thresholds, and for realigning the additional adaptive information image processing unit 14 and additional information image model recovering unit 16 in accordance with the corrected algorithms. The system can also comprise additional demonstration screens 18 and 19, respectively. The adaptive noise and interference information image processing unit 14 can consist of an encoding subunit and a normalizing subunit 22. The encoding subunit, in turn, can comprise a rough encoding subblock 20 and an exact encoding subblock 21. The comparison unit 15 consists of comparing units 23 according to the number of subunits and subblocks in the adaptive noise and interference information image processing unit 14. The noise and interference information image model recovering unit 16 can comprise the same number of subunits and subblocks as in the adaptive noise and interference information image processing unit 14.

Figure 4:
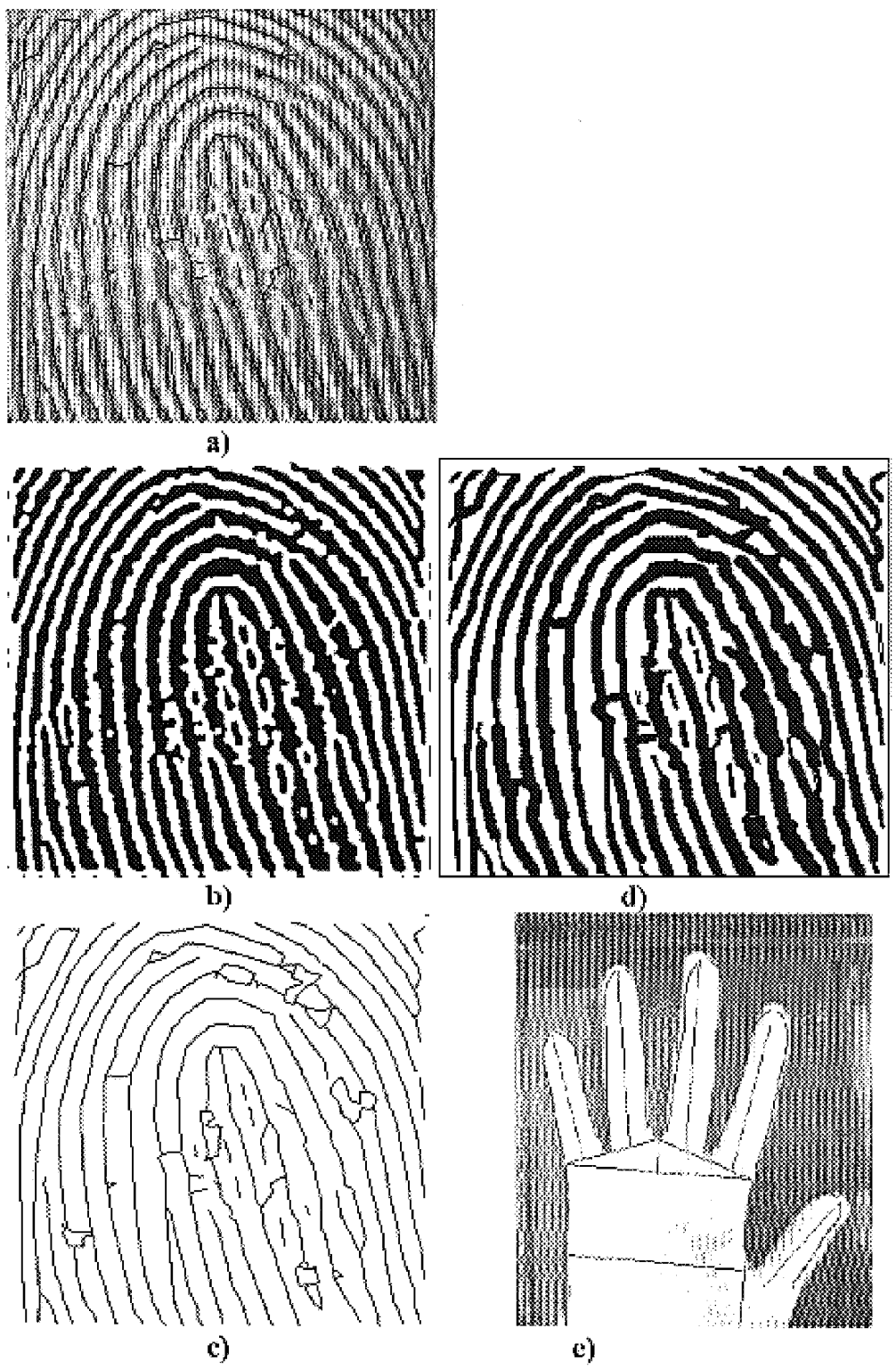
FIG. 4 illustrates the conversions of the input image of a human's fingerprint and palm in Sections a) and e), in creating the algorithms for encoding dactyloscopic lines and human's palm silhouette, in recovering the shape of lines similar to the input image, and in comparing by an expert and testing a correctness of the algorithms for encoding these images on screens 7 and 8 (Sections b) and d)) for the fingerprint, or matched presentation results of the recovered palm silhouette with the initial image (Sections c) and e)).

FIG. 4 shows examples of conversions of information images as a result of selecting the processing algorithms for two types of images: a fragment of a fingerprint and a man's palm. It is seen that during encoding a half-tone image of the fingerprint fragment (FIG. 4, Section a)) simplified images shown in Sections b) and c) of FIG. 4, are obtained in the units 11 and 12. The recovery of a binary image of the fingerprint performed in the unit 3 is shown in FIG. 4, Section d). Thus, if the image discrepancy estimate in the unit 13 does not exceed the given threshold, then the adopted encoding algorithm is considered satisfactory for recognizing fingerprint type images. Moreover, the researcher-operator responsible for choosing adequate algorithms can monitor the results of image conversions by displaying these results on the screen 7 (FIG. 4, Section b)) and screen 8 (FIG. 4, Section d)). Images in the screens can also be superimposed in a manner shown in FIG. 4, Section a) for a fingerprint, and in FIG. 4, Section e) in comparing the accuracy of man's palm encoding algorithms.

The system in FIG. 3 is operated in a manner similar to that of the system in FIG. 2, but information and noise signals are processed simultaneously in the parallel mode. An example of the information and noise image separation procedure is presented in FIG. 5 for the dynamic spectra of speech signals: (a) the initial input speech signal, containing information and noise components; (b) the result of an input signal prefiltering; (c) the extraction of the noise component from the input signal on the basis of the model concepts on the possible form of an information signal; (d) the additional filtration of the extracted noise component; (e) the extraction of the information component from the initial signal after the noise component prefiltering procedure on the basis of the available model concept; (f) the final form of the filtered information signal.

Figure 5:
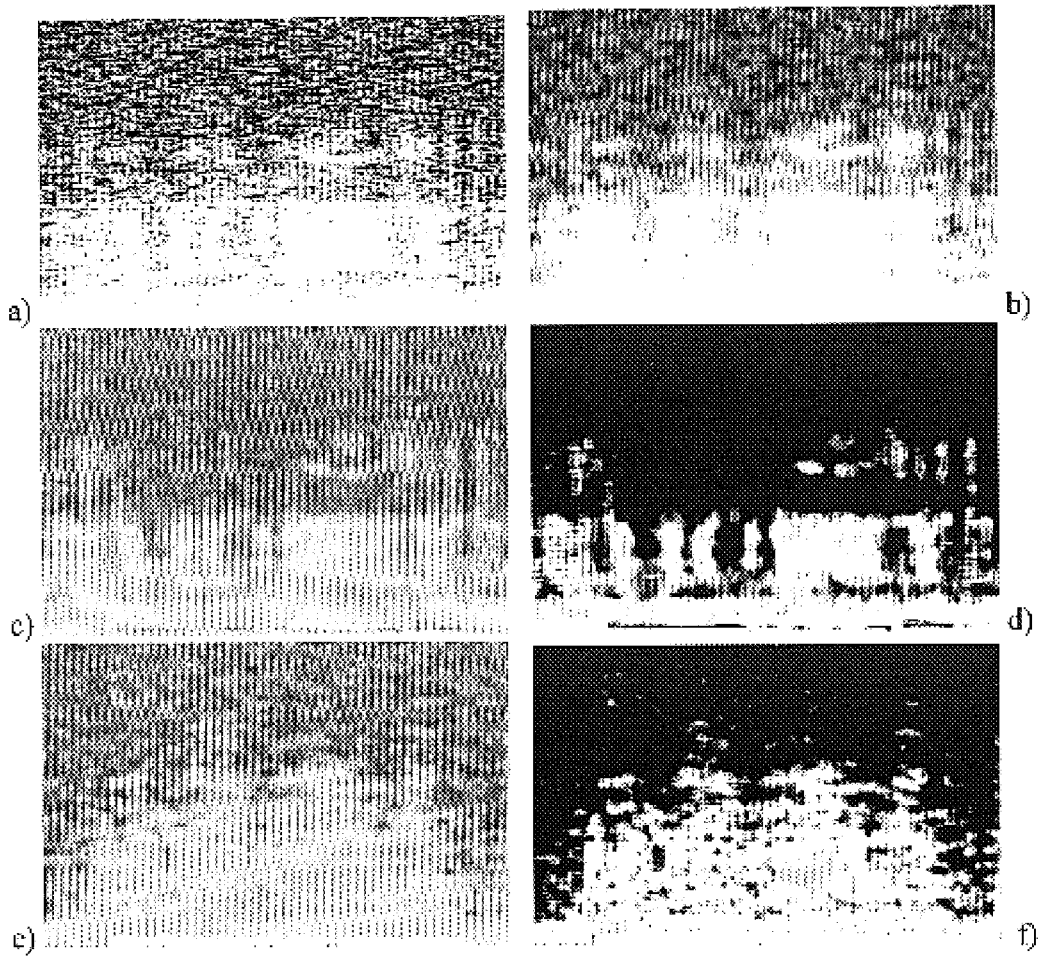
FIG. 5 illustrates the sequence of conversions for separating two speech signals, one of which is assumed to be an information signal and the other a noise signal creating an interference in perceiving the first signal, in Sections a), b), c), d), e) and f).

It is seen that the input signal (FIG. 5, Section a)) represents two speech signals, one related to an information one and the other to a noise, interfering signal. It is assumed that the system in the unit 4 already contains code descriptions of each represented components of a complex input signal, and the unit 6 and units 1, 3, 14, and 16 correspondingly contain algorithms for encoding and recovering these signals. When the input signal (FIG. 5, Section a)) enters the unit 1 (FIGS. 2 and 3), there occurs the steps of prefiltering that signal and extracting the code description of an information signal, which is stored in the unit 4 and also compared in the unit 2, on request from the unit 5, with the set of present archive code data for information signals (FIGS. 2 and 3). The closest code description of the information signal is conveyed through the unit 6 to the adaptive noise signal processing unit 14, and a special procedure is formed on its basis for filtering the information component of the input signal entering the unit 20 for encoding only the noise component. The code description of the noise component on request from the unit 17 is compared in the unit 15 with the set of available archive data for the noise signals, taken from the unit 4. The closest code description of the noise signal is conveyed through unit 6 to the adaptive information signal processing unit 1, and a special procedure is formed on its basis for filtering the noise component in the input signal for encoding only the information component. Such interrelated correction of the filtering and encoding signal algorithms in the units 1 and 14 continues until appropriate decisions on reliable extraction of noise (the result of joint operation of the units 14 to 17 is shown in FIGS. 5c, d) and information signals (the result of joint operation of units 1 to 5 is shown in FIGS. 5e, f) are made in the units 5 and 17. Note that the extracted information and noise signals can be used further for correcting the preformed models of information and noise signals, respectively.

If the steps of comparing in the units 2 and 15 and comparing the resulting estimates with thresholds in the units 5 and 17 show that the obtained estimates exceed the given thresholds for making a positive decision, then the decision unit 5 and/or unit 17 address the recognition algorithm correcting unit 6. In accordance with these requests the unit 6 corrects the recognition algorithms by either specifying their parameters or operation sequence or replacing the algorithms. For this purpose, the recognition algorithm correcting unit 6 produces corresponding control signals to the units 1, 3, 14, and 16 (corresponding subunits and subblocks of these units). According to these control signals, in the memory buffers of these units, subunits, and subblocks, the sets of programs responsible for their operation are changed.

Thus, the present invention ensures the increased recognition accuracy for the wider class of objects and permits to select the most efficient algorithms for solving problems set before this automatic apparatus.

Although this invention was described for its implementation examples, this description is not limiting but is only given for illustrating and better understanding this invention which scope is defined by the claims enclosed here.

What is claimed is:

1. A method for adaptive recognition of information images, comprising steps of:
   processing each input information image in accordance with a recognition algorithm;
   comparing the input information image being processed with a model image in order to estimate discrepancies between the compared images;
   comparing at least one estimate of the obtained discrepancies with at least one predetermined threshold;
   when said estimates exceed the predetermined thresholds, correcting the recognition algorithm, and repeating the previous operations using said recognition algorithm for the same input information image,
   wherein said method further comprising steps of:
      forming models of probable information images;
      for the probable information images, creating the recognizing algorithms based on the formed models;
      processing the information image in accordance with one of the created recognition algorithms;
      performing, after said processing step, a model recovering of the processed information image in accordance with the recovery algorithm which is inverse of the utilized recognition algorithm;
      the step of comparing the input information image being processed is performed with the recovered model image, calculating coincidence estimates, and then performing said step of comparing the estimates with the predetermined thresholds;
      when the predetermined number of estimates do not exceed the predetermined thresholds, deciding on the recognition of the input information image;
      correcting the recognition algorithm when the predetermined number of estimates exceed the predetermined thresholds, and then repeating, using the corrected algorithm for the same input information image, the steps of processing the information image, recovering the model image, comparing those images, and comparing the obtained estimates;
      repeating the previous step until deciding on the recognition of the input information image, or deciding on the absence of possibility for recognizing this image on the basis of an available set of algorithms.

2. The method as claimed in claim 1, wherein the step of processing each input information image includes at least steps of encoding and normalizing said input information image.

3. The method as claimed in claim 2, further comprising, in the step of encoding, a step of at least rough encoding and exact encoding for the input information image.

4. The method as claimed in claim 1 wherein the step of comparing the input information image being processed with the recovered model image is performed for all processing stages and corresponding recovery stages.

5. The method as claimed in claim 1, wherein the recovered model image is displayed for visual perception by an operator.

6. The method as claimed in claim 1, wherein the step of forming models of probable information images is performed in advance.

7. The method as claimed in claim 1, wherein the step of forming models of probable information images is performed during said comparisons.

8. The method as claimed in claim 1, wherein the step of creating the algorithms for recognizing the probable information images is performed in advance.

9. The method as claimed in claim 1, wherein the step of creating the algorithms for recognizing the probable information images is performed during said comparisons.

10. The method as claimed in claim 7, wherein the step of creating the algorithms for recognizing the probable information images is performed during said comparisons.

11. The method as claimed in claim 1, wherein the step of correcting the recognition algorithm is performed by defining more precisely its parameters.

12. The method as claimed in claim 1, wherein the step of correcting the recognition algorithm is performed by defining more precisely its operation sequence.

13. The method as claimed in claim 1, wherein the step of correcting the recognition algorithm is performed by replacing this algorithm.

14. A system for adaptive recognition of information images, comprising:
an adaptive information image processing unit intended for processing an input information image in accordance with a recognition algorithm;
a comparison unit intended for comparing the input information image being processed in the adaptive information image processing unit with a model image, and for estimating discrepancies between the compared images;
a model image correction unit intended for correcting the model image by signals from the comparison unit,
wherein said system further comprising:
a memory unit intended for storing the information image processed by the information image adaptive processing unit at least until finishing the image recognition procedure;
a processed information image model recovering unit intended for recovering the processed information image in accordance with a recovery algorithm which is inverse of the recognition algorithm utilized in the information image adaptive processing unit; and
a decision unit intended for comparing at least one of the discrepancy estimates obtained in the comparison unit with at least one predetermined threshold, and for deciding in dependence on a result of that comparison;
the information image adaptive processing unit being intended for processing the input information image in accordance with any of the created algorithms for recognizing the probable information images;
the comparison unit being intended for comparing the input information image with the model image recovered by the processed information image model recovering unit, and for estimating discrepancies between the compared images; and
the model image correction unit being made in the form of a recognition algorithm correction unit and intended for correcting the next recognition algorithm by a signal from the decision unit in the case when the discrepancy estimates from the comparison unit exceed corresponding thresholds and for realigning the information image adaptive processing unit and the information image model recovering unit in accordance with the corrected algorithms.

15. The system as claimed in claim 14, wherein the information image adaptive processing unit comprises at least an encoding subunit and a feature normalizing subunit.

16. The system as claimed in claim 15, wherein the encoding subunit consists of a rough encoding subblock and an exact encoding subblock.

17. The system as claimed in claim 14, further comprising:
an additional information image adaptive processing unit intended for processing the input information image in accordance with any of the created algorithms for recognizing a probable noise and interference;
an additional processed information image model recovering unit intended for recovering the processed information image in accordance with a recovering algorithm that is inverse of the recognition algorithm utilized in the additional information image adaptive processing unit;
an additional comparison unit intended for comparing the input information image being processed in the additional information image adaptive processing unit with the model image recovered by the additional processed information image model recovering unit, and for estimating discrepancies between the compared images;
an additional decision unit intended for comparing at least one of the discrepancy estimates obtained in the additional comparison unit with at least one additional predetermined threshold, and for deciding in dependence on a result of that comparison;
the memory unit is also intended for storing the information image processed by the additional information image adaptive processing unit at least until finishing the image recognition procedure;
the recognition algorithm correcting unit is also intended for correcting the next algorithm for recognizing a probable noise and interference by a signal from the additional decision unit in the case when the discrepancy estimates from the additional comparison unit exceed corresponding thresholds, and for realigning the additional information image adaptive processing unit and the additional information image model recovering unit in accordance with the corrected algorithms.

18. The system as claimed in claim 17, wherein:
each pair of main and additional units having the same name is made in the form of one common unit having the same name;
the recognition algorithm correcting unit is also intended for alternating the probable information image and probable noise and interference recognition processes in each common unit.

19. The method as claimed in claim 2, wherein the step of model recovering is performed in the same states as the step of processing the input information image but in inverse order with respect to the order in said step of processing the input information image.

20. The system as claimed in claim 14, further comprising a first and second demonstration display for displaying the input information image and the recovered model image, respectively.

* * * * *